Sept. 16, 1924.
C. KRÄMER
1,508,701
HAND OPERATED ARC WELDING APPARATUS
Filed May 13, 1922
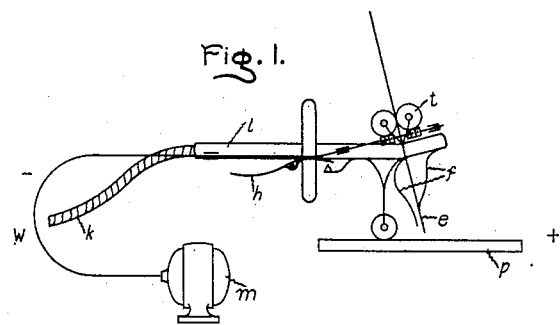
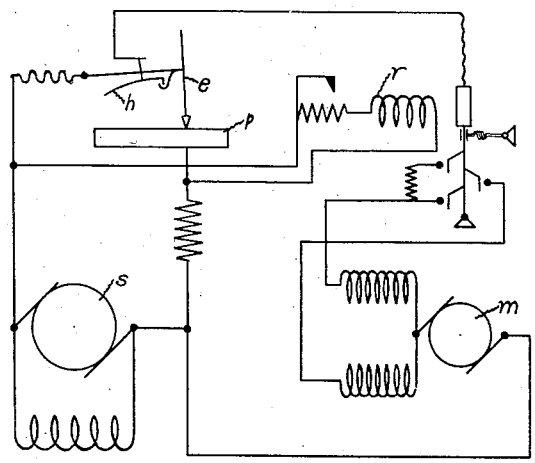
Inventor:
Christian Krämer,
His Attorney.

Patented Sept. 16, 1924.

1,508,701

UNITED STATES PATENT OFFICE.

CHRISTIAN KRÄMER, OF BERLIN-PANKOW, GERMANY, ASSIGNOR TO GENERAL ELECTRIC COMPANY, A CORPORATION OF NEW YORK.

HAND-OPERATED ARC-WELDING APPARATUS.

Application filed May 13, 1922. Serial No. 560,829.

*To all whom it may concern:*

Be it known that I, CHRISTIAN KRÄMER, a citizen of Germany, residing at Berlin-Pankow, Germany, have invented certain new and useful Improvements in Hand-Operated Arc-Welding Apparatus (for which I have filed an application in Germany, May 5, 1919), of which the following is a specification.

Electric arc welding is generally performed by hand and requires great skill on the part of the welder, as the distance of the iron electrode from the work must not exceed 5 to 10 mm. during welding and varies continuously owing to the melting of the electrode. Welding appliances have been designed in which the iron electrode is fed according to the current or the voltage of the arc by means of a small motor. Such mechanical appliances have been used for welding work for which they are suited, but for hand welding this expedient is not feasible, as the feed motor could not be secured to the electrode holder without increasing its weight to such an extent that it could not be handled.

In the accompanying drawing Fig. 1 is a representation of a welding apparatus embodying my invention and Fig. 2 is a circuit diagram.

According to the invention, the feed mechanism is operated by a flexible shaft, as illustrated in Fig. 1, which shaft transmits the rotation of the feed motor to the electrode holder so that it can be handled without difficulty.

The electrode holder $l$ comprises a pipe in which is inserted a cable $k$ supplying current to the electrode $e$ by means of sliding contact springs $f$. The electrode is fed by two rollers $t$ which are actuated from the feed motor $m$ by means of a flexible shaft $w$. The feed rollers $t$ may be actuated by worm gear or toothed gearing and are held tightly to the electrode by springs. An insulated guide roller supports the electrode holder on the work P. The current of the feed motor $m$ is switched on by means of a hand-controlled lever $h$.

The diagram of the appliance—which is not new per se and may be varied as desired—is illustrated in Fig. 2.

The welding dynamo S supplies current to the work P and the electrode $e$. A voltage relay $r$ connected in parallel to the arc is adapted to be adjusted for any desired arc voltage by means of a spring or a series resistance. When the voltage in the arc rises, a contact or a plurality of contacts is closed toward the left which causes rotation of the feed motor so as to shorten the arc. When, on the other hand, the voltage decreases, the relay moves to the opposite side and the motor is regulated in the opposite sense. As mentioned above, connections may be varied as desired.

In order to prevent starting of the feed motor before it is desired by the welder, current is supplied to said motor by means of the hand controlled lever $h$ referred to above which lever is secured to the electrode holder.

The welder takes hold of the appliance, places it on the work and depresses the lever $h$. Current is now supplied to the feed motor. As the arc is not yet struck, the maximum voltage obtains at the relay which makes contact to the left and the motor feeds the electrode toward the work by means of the flexible shaft. When the electrode engages the work, the circuit of the dynamo S is closed, the voltage between the electrode and the work becomes nil, the relay is moved toward the other side and the feed motor causes the arc to be struck for a distance which corresponds to the adjustment of the relay.

Claims:

1. A hand welding apparatus for arc welding of the type wherein motor operated means is provided adapted to feed an electrode continuously to an arc between the electrode and the work characterized by the feature that the rotation of the motor is transmitted to the feeding means by a flexible shaft in order to provide a light and readily handled welding tool and by the feature that a switch is arranged on the welding tool for manually controlling the circuit of the feed motor.

2. A hand welding apparatus as claimed in claim 1 characterized by the feature that a relay controlled by the voltage across the arc is provided for controlling the operation of the feed motor to maintain the desired arc length during welding.

3. A hand welding apparatus as claimed in claim 2 characterized by the feature that connections controlled by the relay are provided for controlling the direction of rotation of the motor whereby the arc may be struck automatically.

In witness whereof I affix my signature.

CHRISTIAN KRÄMER.